Figure 1:
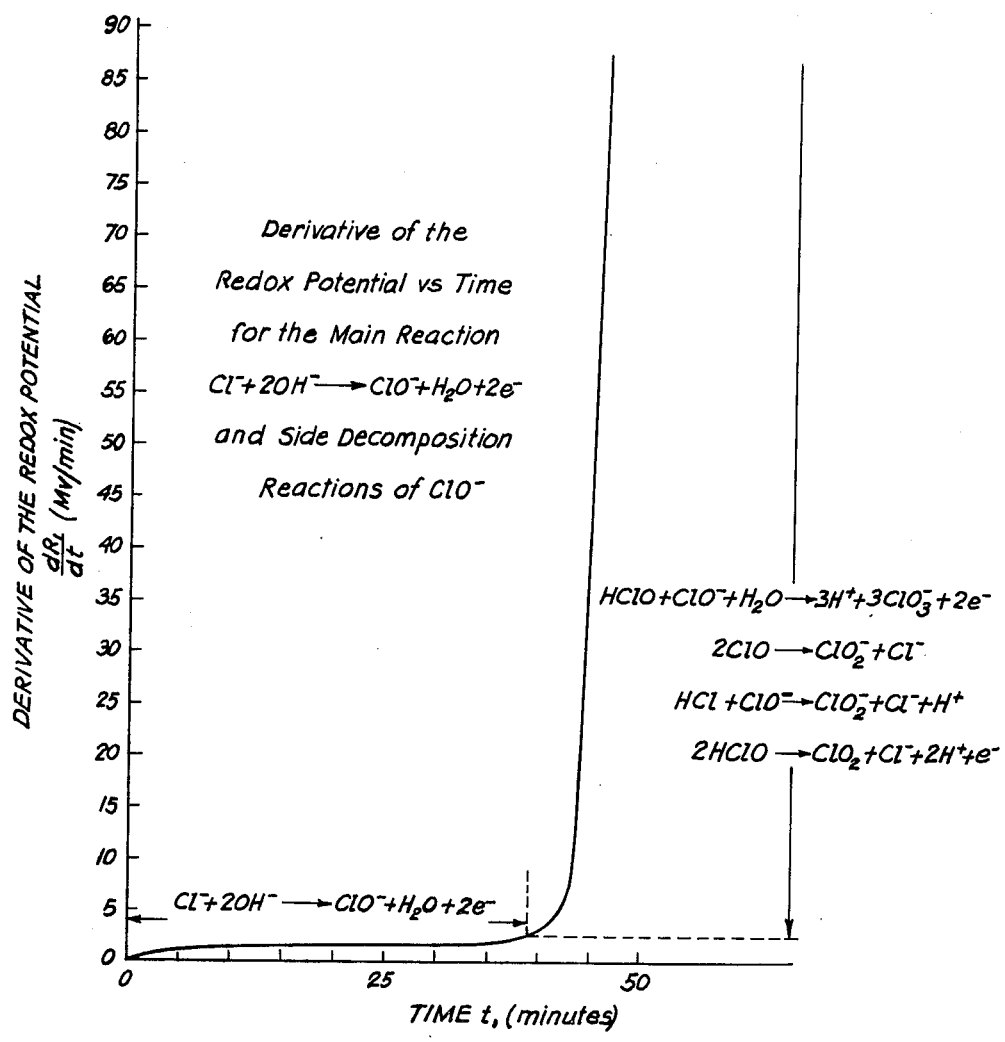

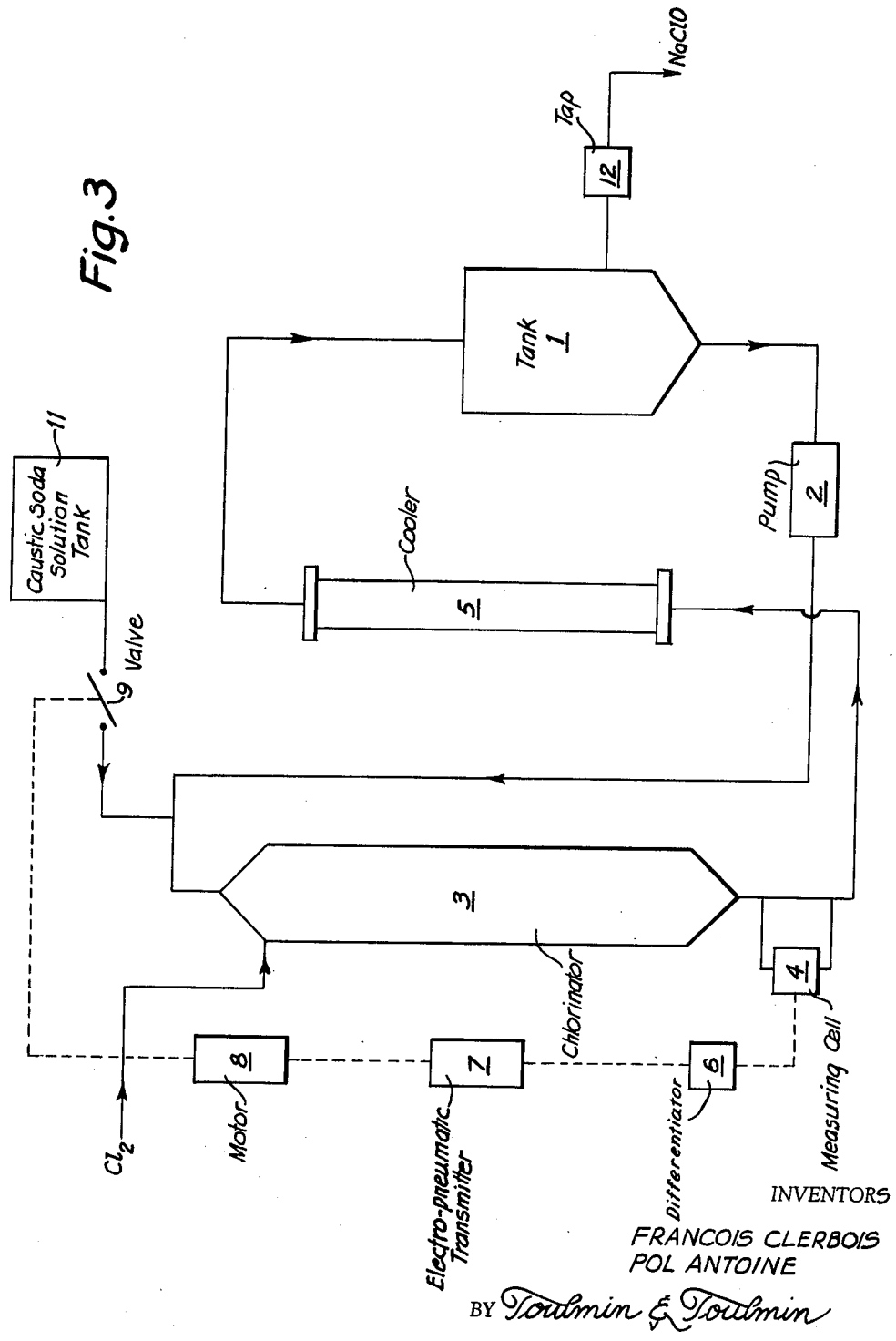

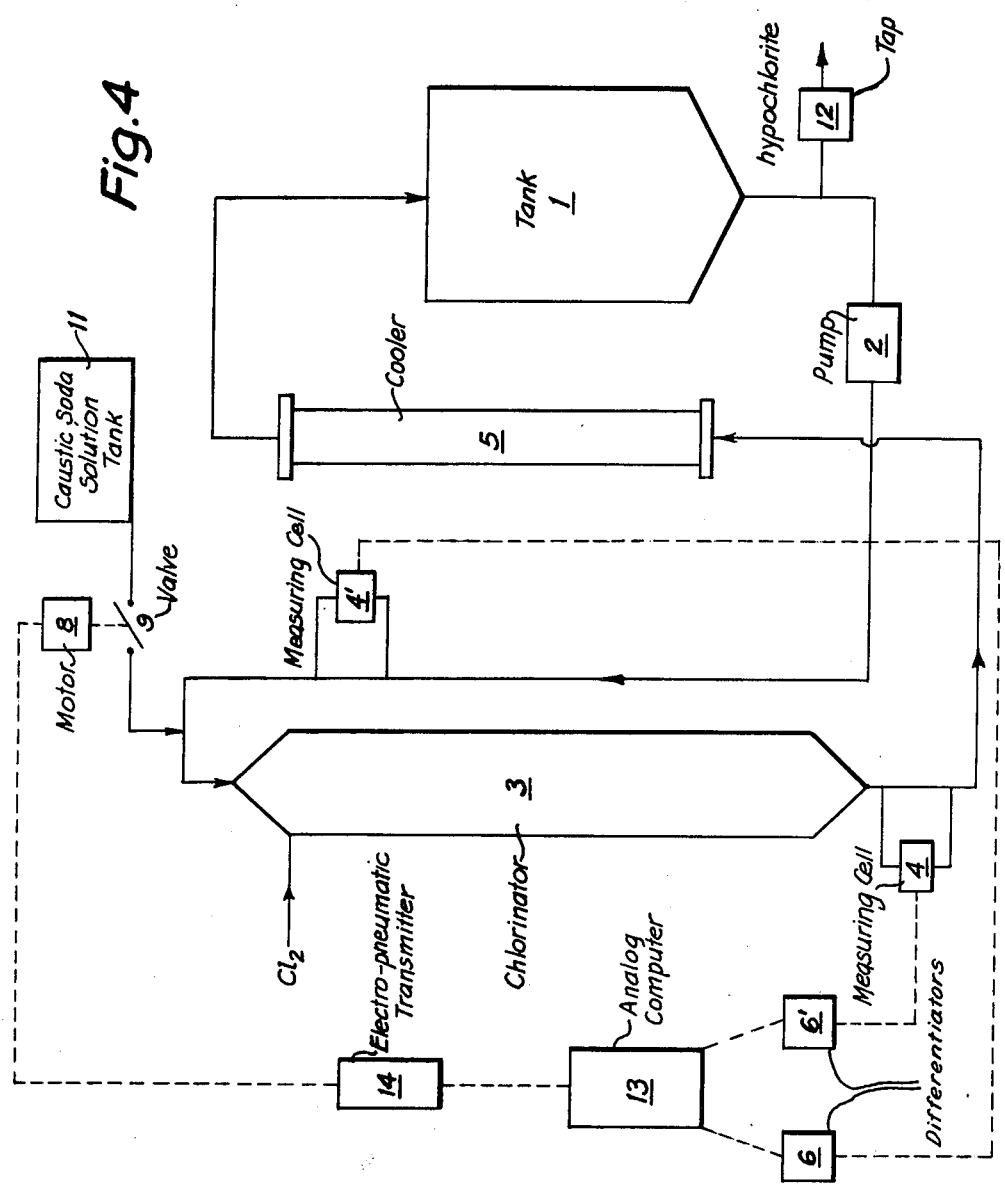

3,199,949
PROCESS CONTROL FOR HYPOCHLORITE PRODUCTION
Francois Clerbois, Uccle-Brussels, and Pol Antoine, Jemeppe-sur-Sambre, Belgium, assignors to Solvay & Cie, Brussels, Belgium
Filed July 10, 1962, Ser. No. 208,817
10 Claims. (Cl. 23—86)

This invention relates to a process for producing hypochlorite by a reaction between gaseous chlorine and an alkaline solution, the reactants being introduced into a reactor in a ratio which is adjusted to avoid decomposition of the formed hypochlorite.

It is known that chlorine in alkaline solutions, particularly in solutions of caustic soda, is converted to hypochlorite according to the equation:

$$Cl_2 + 2NaOH \rightarrow NaCl + NaClO + H_2O$$

This reaction requires the presence of excess base, for in the absence thereof, the formed hypochlorite is decomposed either partially or totally. Consequently, insufficient alkalinity results in a loss of product, and may even lead to an explosive decomposition. Hence, the decomposition of the hypochlorite must be avoided from both the economic and safety standpoints.

This decomposition can, in fact, be avoided by regulating the rate of flow of the chlorine in two periods during the chlorination: at the beginning of the operation, a large quantity of chlorine is introduced into the concentrated alkaline solution; then, when the reaction is sufficiently advanced, the flow of chlorine is greatly reduced and the reaction is completed at a reduced rate.

As another mode of operation, automatically controlled valves have been used to regulate the chlorine or caustic soda feed stream, said valves being adjusted in prompt response to the redox potential of the hypochlorite solution. Based on this variable, suitable apparatus for the continuous production of sodium hypochlorite provides for the passage of an alkaline solution of a controlled quantity through a reactor into which chlorine is injected. The formed hypochlorite solution is passed over electrodes which are used to measure the oxidation-reduction potential, said measurement reflecting the quantity of the alkali present in the solution; and the value of the redox potential in turn, serves to regulate a valve controlling the flow of the chlorine injected into the reactor. Alternatively, it is possible to regulate the introduction of the sodium hydroxide automatically in place of, or in addition to, the chlorine feed.

It is important to note, however, that the control of the supply of one or the other of the reagents to the chlorination reactor in response to the oxidation-reduction potential of the solution discharged therefrom entails serious drawbacks. For example, the redox potential depends to a large degree on the type of the utilized electrodes, their position and orientation. Still further, a much more significant disadvantage is based on the fact that the measurements of the redox potential are far from being reproducible in the hypochlorite solutions; and this lack of reproducibility is, unfortunately, inherent in this redox medium. Accordingly, this inconsistency of the measurements makes it very difficult, if not hazardous, to control the reaction for the production of hypochlorite.

The principal object of this invention is to provide a controlled system which is safe, effective and reliable for the substantial prevention of hypochlorite decomposition in a process of producing hypochlorite by reacting chlorine with an alkaline solution.

Still other objects and advantages of this invention will become apparent upon further study of the specification and appended claims.

According to this invention, the decomposition of the hypochlorite produced in a reaction between gaseous chlorine and an alkaline solution introduced into a reactor in variable proportions can be avoided by continuously so adjusting the proportions of the chlorine and alkaline solution that the derivative with respect to time of the oxidation-reduction potential measured in the liquid contained in the reactor or withdrawn from it, is not subjected to any considerable variation.

Figure 2:
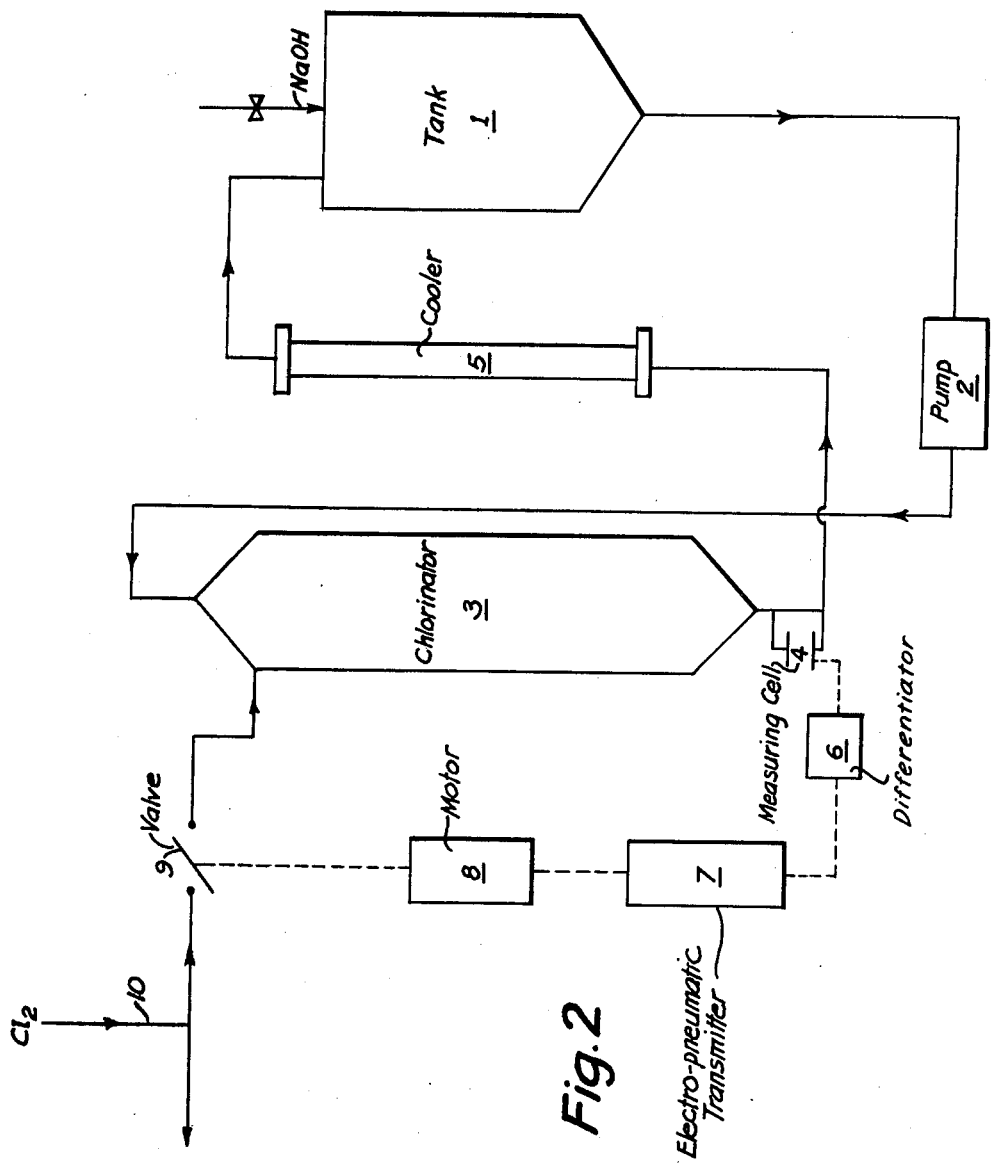

Referring to the attached drawings, FIGURE 1 is a graph showing the relationship of the first derivative of the redox (oxidation-reduction) potential vs. time; FIGURES 2, 3, and 4 show different arrangements of apparatus which can be employed to utilize the process of the invention.

Indeed, it has been found that although the measured values of the oxidation-reduction potential in the hypochlorite solutions vary considerably, the derivative of this potential with respect to time always remains within reproducible values, and precisely characterizes the progress of the chlorination reaction.

The oxidation-reduction potential in a hypochlorite solution of soda is based on the following reaction:

$$Cl^- + 2OH^- \rightarrow ClO^- + H_2O + 2e^-$$

assuming that the decomposition reaction of the hypochlorite is negligible.

The following equation results if $R_1$ is the oxidation-reduction potential in a hypochlorite solution:

$$R_1 = R_0 + \frac{RT}{nF} \log \frac{[ClO^-]}{(Cl^-)(OH^-)^2}$$

in which $R_0$ is the standard potential
$R$ is the perfect gas constant
$T$ is the absolute temperature ° K.
$F$ is the Faraday constant
$n$ is the number of exchanged electrons Since $(ClO^-) = (Cl^-)$, the derivative of $R_1$ with respect to time is:

$$\frac{dR_1}{dt} = \frac{-2RT}{nF} \times \frac{1}{[OH^-]} \times \frac{d(OH^-)}{dt}$$

in which $$\frac{d(OH^-)}{dt} < 0$$

It follows therefrom that a system based on the variations of the derivative presents the following advantages for the regulation of the proportion of the reagents, and in particular of chlorine:

(1) When there is a large excess of base, the rate of change of the concentration of base does not affect the derivative of the redox potential significantly. Thus, when the possibility of hypochlorite decomposition is nil due to a strong concentration of base, the capacity (inertia) of the controlled system is desirably high.

(2) Conversely, when the excess of base substantially disappears, the derivative of the redox potential becomes very sensitive to the rate of change of the concentration of base. Thus, when the risk of hypochlorite decomposition becomes high, the system is controlled with a much greater sensitivity.

On the other hand, local decomposition of the hypochlorite can occur in the reactor according to the following overall reactions:

$$HClO + ClO^- + H_2O \rightarrow 3H^+ + ClO_3^- + Cl^- + 2e^-$$

$$2ClO^- \rightarrow ClO_2^- + Cl^-$$

$$HClO + ClO^- \rightarrow ClO_2^- + Cl^- + H^+$$

$$2HClO \rightarrow ClO_2 + Cl^- + 2H^+ + e^-$$

These reactions are accompanied by a very marked and considerable increase of the derivative of the redox potential in proportion to time, as can be seen from FIGURE 1. In fact, this figure shows that in the beginning of the reaction the derivative varies slightly, for example, that it increases slowly from 0 to 3 m./min., as long as the chlorination of the alkaline solution occurs normally without decomposition of the hypochlorite. However, when the alkalinity reserve of the hypochlorite solution is exhausted, the derivative of the redox potential increases suddenly and then continues very rapidly ad infinitum, because at this moment the variation of the redox potential as a function of time is discontinuous.

The process is controlled by regulating the proportions of reagents so that the derivative of the redox potential with respect to the time does not exceed a predetermined value which is higher than the value of $dR_1/dt$ which is reached during the first stage of the process, i.e., when only the reaction for the formation of hypochlorite is taking place as shown in FIG. 1 for 0 to 38 minutes. The maximum value of the derivative is determined by taking into account the characteristics of the installation of the automatic control system. In general, this value is fixed at a limit of from 20 to 50 times the value of the derivative attained in the first stage of the process and falls on the curve of FIG. 1 beyond 38 minutes. However, since the derivative varies very rapidly as a function of time according to an asymptotic curve, it is possible to set the maximum value of the derivative at a value which is distinctly higher since the automatic apparatus responds very rapidly.

It is also important to note that even if the variation of the derivative of the redox potential, $dR_1/dt$, as a function of time, is characteristic of the reactions occurring during the two phases of the process and independent of the operating conditions, the absolute value of this derivative is nevertheless dependent on said operating conditions.

The process according to the invention can be advantageously applied to all the industrial methods for manufacturing hypochlorite. In all cases, there is obtained a lessening of the possibility of hypochlorite decomposition, and moreover, a higher quality of the manufactured product as well as an improvement in the yield.

The process of this invention is particularly advantageous where the control of the reagent proportions is very difficult. For example, when a batch chlorination of a certain quantity of alkaline solution is conducted by the injection of vaporized chlorine into a suitable reactor, it is always of interest to increase the productivity of the equipment and to reduce the duration of the process by operating with the highest possible chlorine proportion. This cannot be done according to known processes because of the hazards involved with hypochlorite decomposition. As compared therewith, when the chlorine proportion is automatically regulated according to this invention in such a way that the derivative of the redox potential of the hypochlorite solution varies not significantly during the course of the process, the maximum chlorine proportions can be employed at all times, thereby effecting the chlorination within a minimum of time while simultaneously avoiding the decomposition of hypochlorite.

The invention can also be advantageously applied to a continuous manufacturing process of hypochlorite, for instance, by adjusting the proportion of the alkaline feed solution to the chlorinating apparatus in response to the variation of the derivative of the redox potential of the solution discharged from said apparatus.

A particularly economically worthwhile application of this invention involves the utilization of residual chlorine from an electrolytic chlorine-producing cell, which residual chlorine cannot be consumed in other manufacturing processes. It is obvious that such a process must be operable with highly variable chlorine proportions and concentrations and that it is indispensible that substantially all the chlorine be transformed into hypochlorite, lest it be lost. The residual chlorine raw material is characterized by a most irregular flow and chlorine content. The residual chlorine is generally collected all over the chlorine utilizing plants and particularly at the chlorine liquefaction plant.

For the utilization of residual chlorine in the process of this invention, various arrangements of equipment may be employed. A preferred installation can comprise two separate and identical chlorinating apparatuses. One, being in the chlorination stage, receives the available chlorine, and the other one, being filled with fresh alkaline solution, is kept in reserve and may receive any excess chlorine which cannot be directed into the first reactor, lest the hypochlorite be decomposed. According to this invention, the distribution of the chlorine between the two reactors is adjusted automatically in such a way that there is no significant variation of the derivative with respect to time of the redox potential measured in the hypochlorite solution of the first chlorinating apparatus.

In an arrangement of another type functioning according to this invention, the proportion and/or the concentration of the alkaline solution is continuously regulated by one or several valves which are automatically controlled in response to the variations of the derivative with respect to time of the redox potential measured in the reactor liquid or an outlet tap, so that the quantity of alkali introduced into the reactor increases when the derivative of the redox potential increases abnormally.

Still another arrangement of apparatus for the production of hypochlorite from residual chlorine in variable quantities and concentrations, comprises but one chlorinating apparatus. An installation of this type comprises a sole chlorinator which receives all of the available chlorine at every moment; a tank which contains a measured quantity of partially chlorinated liquid; and injection devices for chlorine and the fresh alkaline solution. In such an installation functioning, for instance, continuously, the valve which regulates the admission of fresh alkaline solution is controlled in response to the derivative of the redox potential thereby resulting in the production of high quality hypochlorite while simultaneously absorbing all the residual chlorine from the electrolysis as long as the variations in the quantity of chlorine introduced at every moment are not excessive, maximum permissible percentage deviation in chlorine input being generally about 100% for industrial operation.

Of course, through this improvement allowing for the utilization of installations comprising but one chlorinating apparatus, the production costs of the hypochlorite can be considerably reduced, and concomitantly, the yield per unit of equipment is increased without any supplementary expense.

However, when the variations in the proportion or the concentration of the chlorine are considerable, the volume of the solution contained in the installation can exceed the capacity of equipment. In certain extreme cases, an almost complete emptying of the installation has been observed as a consequence of the tapping of an excessive quantity of produced hypochlorite or, on the contrary, an overflow of the liquid in case too much fresh alkaline solution has been introduced.

Such things can happen when the chlorination rate of the total solution is not within certain limits. This rate is defined as being equal to the quantity of alkaline solution reacting per unit of time in the installation. If this rate is too low, frequent additions of fresh alkaline solutions can cause the volume of the solution to exceed the capacity of the installation thus causing an overflow. If, on the other hand, said rate is too high, the automatic discharging device which operates as soon as the hypochlorite concentration attains the desired value, can discharge too much solution. Such drawbacks, which arise only under very particular conditions, can be overcome by improving the automatic regulation in such a way that the chlorination rate of the total solution is taken into account.

In order to achieve this improved automatic control, the quantity of the fresh alkaline solution introduced into the reactor is continuously regulated by one or several automatically controlled valves, and simultaneously by the variations of the derivative with respect to time of the redox potential measured in the liquid contained in, or withdrawn from, the reactor, and the rate at which the chlorination of the total solution proceeds. In this way, the quantity of alkali introduced into the reactor increases when the derivative of the redox potential increases abnormally, and that as said quantity becomes greater, the higher becomes the rate of chlorination of the total solution.

Said rate can be measured by any adequate means, for instance, by measuring the speed at which the chlorine is introduced into the chlorinating apparatus, since the chlorination reaction, as such, occurs almost instantaneously. It is preferred, however, to measure the chlorination rate of the total solution by the derivative of the redox potential measured in the liquid in the tank containing the measured quantity of the solution, or at the entrance of the chlorinating apparatus, $dR_2/dt$ as shown at $4'$ in FIG. 4.

Said derivative, or any other parameter by which the chlorinating speed of the total solution is measured in the improved installation, acts in conjunction with the derivative of the redox potential measured in the reactor liquid or outlet, $dR_1/dt$ as shown at 4 in FIG. 4, to control the valve regulating the admission of the alkaline lye. These two data can be combined for effecting the control of the valve either by a mechanical or pneumatical coupling of the two regulators controlled by the derivatives, or by a combined electronic device, for instance in a computer.

Such a combination can be realized in a way that for each value of the chlorination speed of the total solution, or for each value of the parameter by which it is measured, as for instance $dR_2/dt$ as shown at $4'$ in FIG. 4, there corresponds a particular position of the regulating device for the admission valve of the alkali. That is to say, that the values of the derivative $dR_1/dt$ determined at 4 in FIG. 4 for which the valve is either completely opened or closed are, in turn, dependent on the chlorination speed of the total solution. For example, when the rate of chlorination increases the valve is opened at lower values than ordinarily necessary for the derivative $dR_1/dt$.

It is believed that the preceding description of this invention is sufficiently complete, clear and concise as to enable one skilled in the art to employ it to the fullest extent. Thus, the following preferred specific embodiments of this invention are merely exemplary, and are not intended to be limitative in any way whatsoever of the broad aspects of the invention as described in the remainder of the specification and appended claims.

*Example 1*

The production of sodium hypochlorite in a batch process from residual chlorine is advantageously conducted in two separate installations, one of which being always in the effective chlorination stage, the other one containing more concentrated caustic soda lye, being kept in reserve for receiving the excess of chlorine which cannot be supplied to the first one.

One of the two installations is schematically illustrated in FIGURE 2. It essentially comprises a tank 1, a circulation pump 2, a chlorinator of the scrubber type 3, a measuring cell of the redox potential 4, a cooler 5, a differentiator 6, an electro-pneumatic transmitter 7 and a motor 8, acting on a valve 9 placed in the supply line for the chlorine.

In the beginning of the operation the tank contains alkaline liquid consisting of caustic soda or of caustic soda partially chlorinated in a previous process. This solution is circulated through the chlorinator by means of a pump at a continuous flow of 50 m.³/h. (m.³/h.=cubic meters per hour).

The residual chlorine derived from the electrolysis is introduced through conduit 10 and the valve 9 comprising an automatic closing device. At the outlet of the chlorinator, at least one portion of the liquid passes through the cell measuring the redox potential, whereafter the liquid is returned into the tank via the cooler 5.

The redox potential is measured in a cell consisting of a shiny platinum wire and a calomel (mercurous chloride) electrode saturated with KCl. This potential is then differentiated and the resulting signal actuates the electro-pneumatic transmitter which in turn actuates a pneumatic motor which, drives the chlorine valve.

In this installation, when the capacity of the scrubber and the quantities of chlorine and soda are taken into account, it can be seen that at the beginning of the reaction the derivative of the redox potential with respect to time varies little and does not exceed 2 mv./min. When the proportion of chlorine introduced into the chlorinator is too high, the derivative increases very rapidly. This tendency is counteracted by the chlorine supply valve.

The degree of closure of said valve increases according to the signal delivered by the differentiator, whereby the valve is controlled in response to deviations of at least 10% in a way that it is completely closed at a value of the derivative of the redox potential which in this case is equal to 40 mv./min.

The following table shows for each of the experiments the final concentrations in chloride ions $(Cl^-)_1$ originating from the decomposition of the hypochlorite, i.e., the difference between the total concentration in chloride ions $(Cl^-)_2$ and the concentrations of the chloride ions which are normally formed during the course of the chlorination reaction of the caustic soda $(Cl^-)_3$. This latter concentration is equal to that of the hypochlorite ions $(ClO^-)$—total chloride ion concentration=final chloride ion concentration+concentration formed during chlorination:

$$(Cl^-)_2 = (Cl^-)_1 + (Cl^-)_3$$
now
$$(Cl^-)_3 = (ClO^-)$$
hence
$$(Cl^-)_1 = (Cl^-)_2 - (ClO^-)$$

The advantages of the invention will become more apparent in reference to the following figures setting forth the highly substantial reduction in the decomposition of the sodium hypochlorite obtained by control based on the derivative of the redox potential.

All of the experiments were conducted in the aforedescribed apparatus. In a first series of experiments, the flow of chlorine was regulated according to known processes. Another series of experiments was conducted thereafter in the same apparatus, however by regulating the flow of the chlorine by a pneumatic valve controlled by a differentiating device, as described above.

| Cl⁻ 1 mol, g./l. from decomposition of hypochlorite ||
|---|---|
| Regulation acc. to known processes | Regulation acc. to this invention |
| 0.130 | 0.030 |
| 0.110 | 0.030 |
| 0.070 | 0.000 |
|  | 0.050 |
|  | 0.020 |

It is obvious from the above table that the present process provides the new and unexpected results of decreased hypochlorite decomposition.

*Example 2*

FIGURE 3 illustrates another installation for the production of sodium hypochlorite from solutions of caustic soda and residual chlorine. This installation comprises a tank 1 provided with a tapping device 12, a circulation pump 2, a chlorinator of the scrubber type 3, a measuring cell of the redox potential 4, a cooler 5, a differentiating device 6, an electropneumatic transmitter 7, and a motor 8 acting on a valve 9 positioned on the conduit supplying the fresh caustic soda solution from tank 11.

The pump 2 ensures the circulation of the alkaline liquid in the scrubber. This liquid consists of caustic soda which is more or less chlorinated and circulates at a continuous flow of, for example, 50 m.³/h.

All of the residual chlorine originating from the electrolysis is introduced into the scrubber. At the output of the same, at least one portion of the chlorinated liquid passes through a measuring cell for the redox potential, whereafter the liquid is reconducted into the tank 1 after having passed through the cooler.

The redox potential is measured in a cell consisting of a brilliant platinum wire and a calomel electrode saturated with KCl. This potential is then differentiated and the resulting signal actuates the electro-pneumatic transmitter which, in turn, acts on a valve that is actuated by a motor. This valve is positioned in a conduit through which the fresh soda solution is conducted from the tank to the scrubber.

It can be seen in this installation, when the capacity of the scrubber and the flows of the chlorine and the soda are taken into account, that under normal conditions, when the alkali is present in excess, the derivative of the redox potential with respect to time changes little and does not exceed 2 mv./min. When the quantity of chlorine introduced into the chlorinator becomes too high, that is, when the quantity of alkali present in the solution is insufficient, the derivative of the redox potential increases very rapidly. At this moment the automatic control device acts on the valve positioned on the supply conduit for the caustic soda. The opening of this valve allows for the admission of caustic soda neutralizing the excessive chlorine. As soon as the derivative reaches its normal value, the valve closes again and the introduction of fresh caustic soda is discontinued.

Thus, automatic regulation allows for the production of hypochlorite under normal conditions without decomposition of the formed hypochlorite in spite of considerable variations in the flow and the concentration of the chlorine introduced into the chlorinator. The produced hypochlorite is withdrawn from tank 1 by device 12 as soon as its concentration reaches the desired value.

*Example 3*

FIGURE 4 illustrates an installation for the production of sodium hypochlorite from solutions of caustic soda and residual chlorine according to a known process and provided with an improved regulating system.

This installation comprises a tank 1 provided with a tapping device 12, a circulation pump 2, a chlorinator of the scrubber type 3, two measuring cells of the redox potential 4, and 4', a cooler 5, two differentiating devices 6 and 6', an analog computer 13, an electro-pneumatic transmitter 14, and a motor 8 acting on the valve 9 located on the conduit supplying the fresh caustic soda solution out of tank 11.

The pump 2 insures the circulation of the liquid from tank 1 into the scrubber 3. This liquid consists of partially chlorinated caustic soda, circulates at a constant flow of, for example, 50 m.³/h., and passes at least in part through the measuring cell 4' for the redox potential.

All the residual chlorine from the electrolysis is introduced into the scrubber. At the output of the latter, at least one portion of the chlorinated liquid passes through the measuring cell of the oxido-reduction potential 4, whereafter the liquid is reintroduced into tank 1 after having passed through the cooler.

The redox potentials are measured at the output of the scrubber and of the tank by cells consisting of a shining platinum wire and of a calomel electrode saturated with KCl. These potentials are then differentiating, afterwards combined and the resulting signal actuates the electro-pneumatic transmitter which acts in its turn on the valve positioned in the supply conduit of the caustic soda. The opening of the valve increases according to the signal delivered by the computer. It is terminated in the considered case when $dR_1/dt$ at 4 reaches 20 mv./m. The values of $dR_2/dt$ at 4' ensure the opening of the valve for values of $dR_1/dt$ lower than 20 mv./min. in the case of a rapid chlorination and ensure the closing of the valve at low values of $dR_1/dt$ in case of a slow chlorination. The values of $dR_2/dt$ are set between 1 and 20 mv./min. according to the desired level in tank 1 and the particular characteristics of the installation.

The produced hypochlorite is withdrawn from tank 1 by the device 12 as soon as its concentration reaches the desired value.

With respect to the present invention, it is important to appreciate that the utilization of a control system based on the derivative of the redox potential of the hypochlorite reaction solution is entirely different from the mere selection of a conventional derivative mode of control in which there is a continuous linear relation between the derivative function of a controlled variable and the rate at which a final control element attains its equilibrium position. The latter mode of control is generally, if not always, used in conjunction with the proportional (linear) mode and reset (integral) mode. In contrast, in the present invention, the derivative function itself is the sole controlling variable.[1] This is, of course, the essence of the invention.

The differentiation of the cell measurement of the redox potential can be accomplished by a differentiating device of the type which is schematized in "Machine à Calculer Électroniques — Arithmétiques et Analogiques," M. Pélegrin, Dunod, 1959, p. 68. The output of this differentiator actuates a conventional electro-pneumatic transmitter of the type usually employed in a regulating system.

From the foregoing description, one skilled in the art can easily ascertain the essential characteristics of this invention, and without departing from the spirit and scope thereof, can make various changes and modifications of the invention to adapt it to various usages and conditions. For example, it is apparent that this invention, while being directed to the manufacture of hypochlorite, is also amenable to the control of any process wherein the derivative function of a measured variable such as a redox potential, normally remains constant during a reaction, but changes in value suddenly in response to improper operating con-

---

[1] In conventional systems, the position of a final control element is fixed by an independent variable ($x$). In the improved system of the present invention, the controlling variable is the derivative ($dx/dt$) of the independent variable of the process, and this derivative determines the position of the control and not the rate at which it attains its position. The derivative function ($dx/dt$) is thus the independent variable of the regulation system of this invention.

ditions. Consequently, such changes and modifications are properly, equitably and intended to be within the full range of equivalence of the following claims.

What is claimed is:

1. In a process for the production of sodium hypochlorite from a solution of caustic soda and a current of gaseous chlorine in a chlorinator having inlet and discharge conduits wherein the concentrations and amounts of the mixture of said sodium hypochlorite, caustic soda and gaseous chlorine vary with time and said amounts of caustic soda and gaseous chlorine are regulated to maintain a slight alkalinity to prevent decomposition of said sodium hypochlorite, said regulation being performed by measurements of the redox potential of said mixture, the improvement comprising measuring said redox potential in at least one of said chlorinator and said inlet and discharge conduits, converting said redox potential into an impulse corresponding to the first derivative of said redox potential relative to time and regulating by said impulse the addition of at least one of said caustic soda and chlorine, said addition being made in the direction of maintaining substantially constant said first derivative of said redox potential.

2. The process of claim 1, wherein said chlorine advention. dition is automatically adjusted in response to a deviation of at least about 10% in the value of said first derivative.

3. The process of claim 1, wherein said sodium hydroxide addition is automatically adjusted in response to a deviation of at least about 10% in the value of said first derivative.

4. The process of claim 1, wherein said sodium hydroxide concentration is automatically adjusted in response to a deviation of at least about 10% in the value of said first derivative.

5. The process of claim 1, further comprising automatically adjusting at least one feed stream in response to the rate of chlorination of the total reactant solution.

6. The process of claim 5, wherein the addition of sodium hydroxide is automatically increased in response to said rate of chlorination of said reactant solution.

7. The process of claim 5, wherein the addition of sodium hydroxide feed is automatically adjusted in response to both said first derivative and said rate.

8. The process of claim 1, wherein said chlorine is obtained from a source which is subject to wide fluctuations in rate, and wherein said addition of chlorine is adjusted in response to abnormal deviations of said first derivative, and further comprising the step of passing any excess chlorine resulting from said fluctuating source and said adjustment to a standby chlorinator filled with sodium hydroxide solution, thereby utilizing the chlorine source to its fullest extent.

9. The process of claim 1, wherein said chlorine is obtained from a source which is subject to wide fluctuations in rate, and wherein any excess chlorine fed into said reaction solution is immediately neutralized by automatically increasing the addition of said sodium hydroxide feed stream in response to the abnormal deviation of said first derivative which results from said excess chlorine.

10. The process of claim 9, further comprising automatically adjusting said sodium hydroxide addition in additional response to the rate of chlorination of the total reactant solution.

References Cited by the Examiner

UNITED STATES PATENTS

| 2,950,178 | 8/60 | Halfter et al. | 23—253 |
| 3,051,631 | 8/62 | Harbin et al. | 23—230 |

FOREIGN PATENTS

| 923,945 | 2/47 | France. |

OTHER REFERENCES

Baker et al.: "A Pulse Amplifier for Performing Differential Electrometric Titrations," Transactions of the Electrochemical Society, vol. LXXVI, 1939, pp. 75–84.

MORRIS O. WOLK, *Primary Examiner.*

JAMES H. TAYMAN, Jr., *Examiner.*